United States Patent
Shirai (10) Patent No.: US 12,273,065 B2
(45) Date of Patent: Apr. 8, 2025

(54) MOTOR CONTROL DEVICE AND ELECTRIC PUMP DEVICE

(71) Applicant: NIDEC POWERTRAIN SYSTEMS CORPORATION, Kanagawa (JP)

(72) Inventor: Yasuhiro Shirai, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 108 days.

(21) Appl. No.: 18/340,895

(22) Filed: Jun. 26, 2023

(65) Prior Publication Data

US 2024/0007028 A1    Jan. 4, 2024

(30) Foreign Application Priority Data

Jun. 30, 2022   (JP) ................................. 2022-106336

(51) Int. Cl.
    *H02P 6/182*      (2016.01)
    *H02P 6/15*       (2016.01)

(52) U.S. Cl.
    CPC .................................. *H02P 6/153* (2016.02)

(58) Field of Classification Search
    CPC ............................... H02P 6/182; H02P 6/153
    USPC .................................................... 318/400.14
    See application file for complete search history.

(56) References Cited

U.S. PATENT DOCUMENTS

| | | | |
|---|---|---|---|
| 2001/0054874 A1* | 12/2001 | Oku ......................... | H02P 6/085 |
| | | | 318/599 |
| 2006/0170383 A1* | 8/2006 | Narumi ..................... | H02P 6/10 |
| | | | 318/400.04 |
| 2010/0013427 A1* | 1/2010 | Kelley ................ | H02P 23/0077 |
| | | | 318/812 |
| 2010/0295490 A1 | 11/2010 | Kuroshima et al. | |
| 2017/0353131 A1* | 12/2017 | Usagawa ................ | H02P 27/08 |
| 2019/0245461 A1* | 8/2019 | Kim ........................ | H02P 23/14 |
| 2021/0391816 A1* | 12/2021 | Sega ........................ | H02P 25/03 |

* cited by examiner

*Primary Examiner* — Gabriel Agared
(74) *Attorney, Agent, or Firm* — HAUPTMAN HAM, LLP (57) ABSTRACT

A control device for a three-phase motor includes a drive circuit that converts DC power supply voltage into three-phase AC voltage and supplies the three-phase AC voltage to the three-phase motor, a first voltage detection unit that detects terminal voltage of three phases of the three-phase motor, and a control unit that detects a point at which a first voltage value, which is a detection value of the terminal voltage, intersects a predetermined zero-cross determination level as a zero-cross point, and controls the drive circuit based on a detection result of the zero-cross point. The control unit corrects the first voltage value by multiplying the first voltage value by a first coefficient inversely proportional to an output duty ratio with respect to the three-phase motor in a case where the output duty ratio is equal to or less than a predetermined threshold.

6 Claims, 5 Drawing Sheets

| ENERGIZATION PATTERN |||||||  PHASE PATTERN ||||
|---|---|---|---|---|---|---|---|---|---|---|
| No. | $Q_{UH}$ | $Q_{VH}$ | $Q_{WH}$ | $Q_{UL}$ | $Q_{VL}$ | $Q_{WL}$ | No. | $H_U$ | $H_V$ | $H_W$ |
| PA1 | 1 | 0 | 0 | 0 | 0 | 1 | PB1 | 1 | 1 | 0 |
| PA2 | 1 | 0 | 0 | 0 | 1 | 0 | PB2 | 1 | 0 | 0 |
| PA3 | 0 | 0 | 1 | 0 | 1 | 0 | PB3 | 1 | 0 | 1 |
| PA4 | 0 | 0 | 1 | 1 | 0 | 0 | PB4 | 0 | 0 | 1 |
| PA5 | 0 | 1 | 0 | 1 | 0 | 0 | PB5 | 0 | 1 | 1 |
| PA6 | 0 | 1 | 0 | 0 | 0 | 1 | PB6 | 0 | 1 | 0 |

MOTOR CONTROL DEVICE AND ELECTRIC PUMP DEVICE

CROSS-REFERENCE TO RELATED APPLICATIONS

The present invention claims priority under 35 U.S.C. § 119 to Japanese Patent Application No. 2022-106336 filed on Jun. 30, 2022, the entire content of which is incorporated herein by reference.

FIELD OF THE INVENTION

The present invention relates to a motor control device and an electric pump device.

BACKGROUND

As a control method of a sensorless motor, sensorless control, in which a point at which induced voltage appearing in each three-phase terminal voltage of a motor intersects neutral point potential is detected as a zero-cross point, and energization control of the motor is performed based on a detection result of the zero-cross point, is known. Conventionally, a technique for stably driving a sensorless motor in a low rotation range is known.

In a case where a sensorless motor is controlled at a low duty ratio, there is a possibility that a detection value of induced voltage deviates from a theoretical voltage value due to a response delay of hardware in a motor control device. In this case, a detection timing of a zero-cross point deviates from an ideal timing, and as a result, there has been a possibility that it is difficult to stably perform sensorless control of a motor. The above conventional technique cannot solve such a technical problem.

SUMMARY

One exemplary aspect of a motor control device of the present invention is a motor control device that controls a three-phase motor. The motor control device includes a drive circuit that converts DC power supply voltage into three-phase AC voltage and supplies the three-phase AC voltage to the three-phase motor, a first voltage detection unit that detects terminal voltage of three phases of the three-phase motor, and a control unit that detects a point at which a first voltage value, which is a detection value of the terminal voltage, intersects a predetermined zero-cross determination level as a zero-cross point, and controls the drive circuit based on a detection result of the zero-cross point. The control unit corrects the first voltage value by multiplying the first voltage value by a first coefficient inversely proportional to an output duty ratio with respect to the three-phase motor in a case where the output duty ratio is equal to or less than a predetermined threshold.

One exemplary aspect of an electric pump device of the present invention includes a three-phase motor having a shaft, a pump located on a first side in an axial direction of the shaft and driven by the three-phase motor via the shaft, and the motor control device of the above aspect that controls the three-phase motor.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present invention will be described in detail with reference to the drawings.

Figure 1:
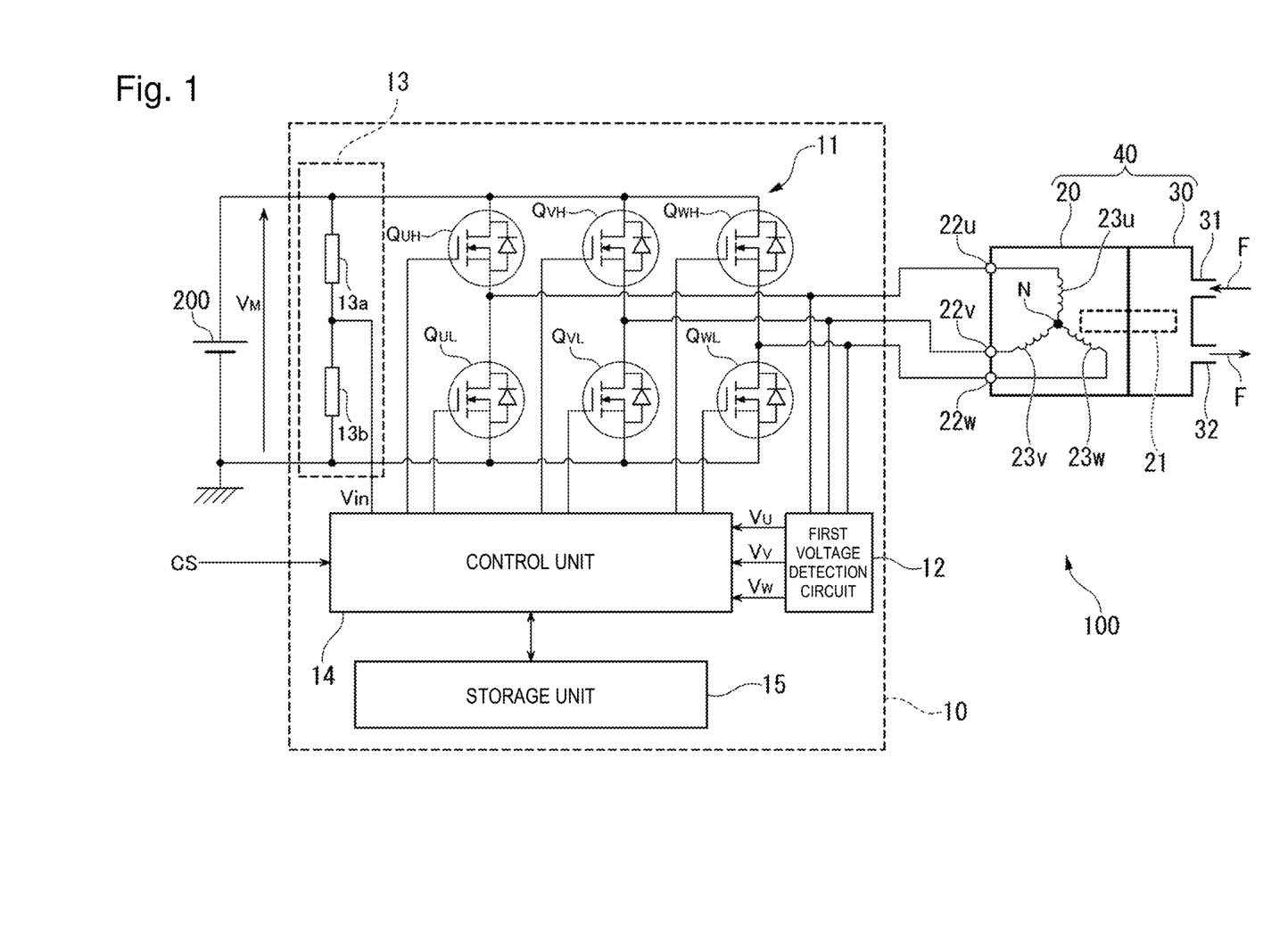
FIG. 1 is a block diagram schematically illustrating an electric pump device 100 including a motor control device 10 according to the present embodiment.

FIG. 1 is a block diagram schematically illustrating an electric pump device 100 including a motor control device 10 according to the present embodiment. As illustrated in FIG. 1, the electric pump device 100 includes the motor control device and an electric pump 40. The electric pump 40 includes a three-phase motor 20 and a pump 30. The electric pump device 100 is, for example, a device that supplies cooling oil F to a driving motor mounted on a hybrid vehicle.

The motor control device 10 is a device that controls the three-phase motor 20 of the electric pump 40 without a position sensor such as a Hall sensor. Specifically, the motor control device 10 detects, as a zero-cross point, a point at which induced voltage appearing in each three-phase terminal voltage of the three-phase motor 20 intersects a predetermined zero-cross determination level, and performs energization control of the three-phase motor 20 on the basis of a detection result of the zero-cross point. Details of the motor control device 10 will be described later.

The three-phase motor 20 is, for example, an inner-rotor type three-phase brushless DC motor, and is a sensorless motor having no position sensor such as a Hall sensor. The three-phase motor 20 includes a shaft 21, a U-phase terminal 22u, a V-phase terminal 22v, a W-phase terminal 22w, a U-phase coil 23u, a V-phase coil 23v, and a W-phase coil 23w.

Further, although not illustrated in FIG. 1, the three-phase motor 20 includes a motor housing, and a rotor and a stator that are housed in the motor housing. The rotor is a rotating body rotatably supported by a bearing component inside the motor housing. The stator is fixed in a state of surrounding an outer peripheral surface of the rotor inside the motor housing, and generates an electromagnetic force necessary for rotating the rotor.

The shaft 21 is a shaft-like body coaxially joined to the rotor in a state of axially penetrating the radially inner side of the rotor. The U-phase terminal 22u, the V-phase terminal 22v, and the W-phase terminal 22w are metal terminals exposed from a surface of the motor housing. Although details will be described later, the U-phase terminal 22u, the V-phase terminal 22v, and the W-phase terminal 22w are electrically connected to a drive circuit 11 of the motor control device 10. The U-phase coil 23u, the V-phase coil 23v, and the W-phase coil 23w are excitation coils provided in the stator. For example, the U-phase coil 23u, the V-phase coil 23v, and the W-phase coil 23w are star-connected inside the three-phase motor 20.

The U-phase coil 23u is electrically connected between the U-phase terminal 22u and a neutral point N. The V-phase coil 23v is electrically connected between the V-phase terminal 22v and the neutral point N. The W-phase coil 23w is electrically connected between the W-phase terminal 22w and the neutral point N. When the energization states of the U-phase coil 23u, the V-phase coil 23v, and the W-phase coil 23w are controlled by the motor control device 10, an electromagnetic force necessary for rotating the rotor is generated. When the rotor rotates, the shaft 21 also rotates in synchronization with the rotor.

The pump 30 is located on a first side in an axial direction of the shaft 21 of the three-phase motor 20, and is driven by the three-phase motor 20 via the shaft 21. When the pump 30 is driven by the three-phase motor 20, the pump 30 discharges the cooling oil F. The pump 30 has an oil suction port 31 and an oil discharge port 32. The cooling oil F is sucked into the pump 30 from the oil suction port 31 and then discharged to the outside of the pump 30 from the oil discharge port 32. As described above, the electric pump 40 is configured by connecting the pump 30 and the three-phase motor 20 adjacent to each other in the axial direction of the shaft 21.

The motor control device 10 is a device that controls the three-phase motor 20 without a position sensor on the basis of a rotation speed command signal CS output from a host control device (not illustrated). As an example, the host control device is an in-vehicle electronic control unit (ECU) mounted on a hybrid vehicle. The motor control device 10 includes a drive circuit 11, a first voltage detection circuit 12 (first voltage detection unit), a second voltage detection circuit (second voltage detection unit) 13, a control unit 14, and a storage unit 15.

The drive circuit 11 is a circuit that converts DC power supply voltage $V_M$ into three-phase AC voltage and supplies the three-phase AC voltage to the three-phase motor 20. The drive circuit 11 converts the DC power supply voltage $V_M$ supplied from a DC power supply 200 into three-phase AC voltage and outputs the three-phase AC voltage to the three-phase motor 20. As an example, the DC power supply 200 is one of a plurality of batteries mounted on a hybrid vehicle, and supplies the DC power supply voltage $V_M$ of 12 V to, for example, a 12-V in-vehicle system.

The drive circuit 11 includes a U-phase upper arm switch $Q_{UH}$, a V-phase upper arm switch $Q_{VH}$, a W-phase upper arm switch $Q_{WH}$, a U-phase lower arm switch $Q_{UL}$, a V-phase lower arm switch $Q_{VL}$, and a W-phase lower arm switch $Q_{WL}$. In the present embodiment, each of the arm switches is, for example, an N-channel MOS-FET.

A drain terminal of the U-phase upper arm switch $Q_{UH}$, a drain terminal of the V-phase upper arm switch $Q_{VH}$, and a drain terminal of the W-phase upper arm switch $Q_{WH}$ are electrically connected to a positive electrode terminal of the DC power supply 200. A source terminal of the U-phase lower arm switch $Q_{UL}$, a source terminal of the V-phase lower arm switch $Q_{VL}$, and a source terminal of the W-phase lower arm switch $Q_{WL}$ are electrically connected to a negative electrode terminal of the DC power supply 200 via a shunt resistor 12. Note that the negative electrode terminal of the DC power supply 200 is electrically connected to the in-vehicle ground.

A source terminal of the U-phase upper arm switch $Q_{UH}$ is electrically connected to each of the U-phase terminal 22u of the three-phase motor 20 and a drain terminal of the U-phase lower arm switch $Q_{UL}$. A source terminal of the V-phase upper arm switch $Q_{VH}$ is electrically connected to each of the V-phase terminal 22v of the three-phase motor 20 and a drain terminal of the V-phase lower arm switch $Q_{VL}$. A source terminal of the W-phase upper arm switch $Q_{WH}$ is electrically connected to each of the W-phase terminal 22w of the three-phase motor 20 and a drain terminal of the W-phase lower arm switch $Q_{WL}$.

A gate terminal of the U-phase upper arm switch $Q_{UH}$, a gate terminal of the V-phase upper arm switch $Q_{VH}$, and a gate terminal of the W-phase upper arm switch $Q_{WH}$ are electrically connected to the control unit 13. Further, a gate terminal of the U-phase lower arm switch $Q_{UL}$ f a gate terminal of the V-phase lower arm switch $Q_{VL}$, and a gate terminal of the W-phase lower arm switch $Q_{WL}$ are also electrically connected to the control unit 13.

As described above, the drive circuit 11 is configured of a three-phase full-bridge circuit having three upper arm switches and three lower arm switches. The drive circuit 11 configured as described above converts the DC power supply voltage $V_M$ supplied from the DC power supply 200 into three-phase AC voltage, with switching control of each of the arm switches by the control unit 13, and outputs the three-phase AC voltage to the three-phase motor 20.

In the present embodiment, a case where a sensorless 120° energization system is used as an energization system of the three-phase motor 20 will be exemplified. Hereinafter, for convenience of description, the first voltage detection circuit 12, the second voltage detection circuit 13, the control unit 14, and the storage unit 15 will be described after a basic principle of the sensorless 120° energization system is described. Note that the basic principle of the sensorless 120° energization system described below is merely an example, and the present invention is not limited to this.

Figure 2:
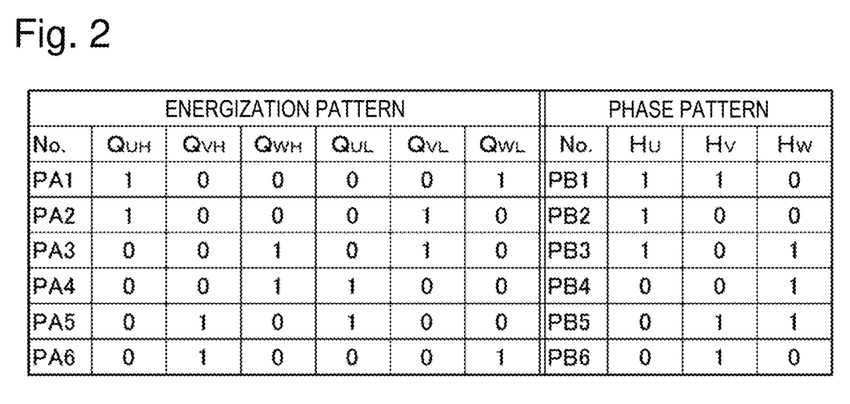
FIG. 2 is a diagram illustrating an example of an energization pattern and a phase pattern used in a sensorless 120° energization system in the present embodiment.

When the sensorless 120° energization system is used, each arm switch is subjected to switching control based on an energization pattern illustrated in FIG. 2. As illustrated in FIG. 2, an energization pattern of the 120° energization system includes six energization patterns PA1, PA2, PA3, PA4, PA5, and PA6. In FIG. 2, between "1" and "0" arranged in columns from "$Q_{UH}$" to "$Q_{WL}$", "1" means that a corresponding arm switch is controlled to be turned on, and "0" means that a corresponding arm switch is controlled to be turned off.

Figure 3:
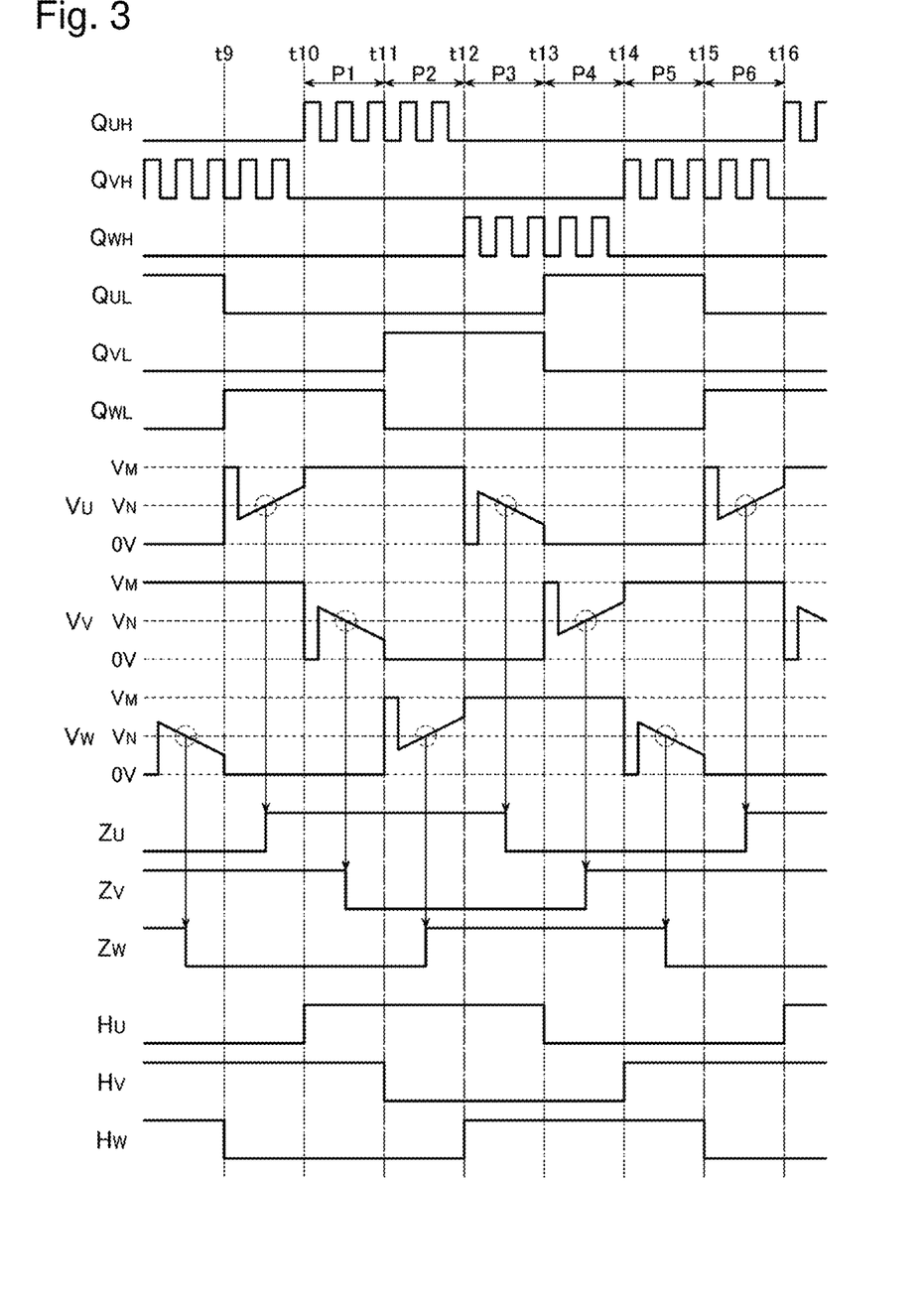
FIG. 3 is a timing chart illustrating a basic principle of the sensorless 120° energization system in the present embodiment.

In FIG. 3, an energization period P1 from time t10 to time t11 indicates a period in which each arm switch is subjected to switching control based on the energization pattern PA1. In the energization period P1, the U-phase upper arm switch $Q_{UH}$ and the W-phase lower arm switch $Q_{WL}$ are turned on, and the remaining arm switches are turned off. In the energization period P1, only the U-phase upper arm switch $Q_{UH}$ is subjected to switching control at a predetermined switching duty ratio. In the energization period P1, drive current (power supply current) flows to the U-phase coil 23u and the W-phase coil 23w from the U-phase terminal 22u toward the W-phase terminal 22w. That is, energization phases in the energization period P1 are the U phase and the W phase.

In FIG. 3, an energization period P2 from time t11 to time t12 indicates a period in which each arm switch is subjected to switching control based on the energization pattern PA2.

In the energization period P2, the U-phase upper arm switch $Q_{UH}$ and the V-phase lower arm switch $Q_{VL}$ are turned on, and the remaining arm switches are turned off. Also in the energization period P2, only the U-phase upper arm switch $Q_{UH}$ is subjected to switching control at a predetermined switching duty ratio. In the energization period P2, drive current flows to the U-phase coil 23u and the V-phase coil 23v from the U-phase terminal 22u toward the V-phase terminal 22v. That is, energization phases in the energization period P2 are the U phase and the V phase.

In FIG. 3, an energization period P3 from time t12 to time t13 indicates a period in which each arm switch is subjected to switching control based on the energization pattern PA3. In the energization period P3, the W-phase upper arm switch $Q_{WH}$ and the V-phase lower arm switch $Q_{VL}$ are turned on, and the remaining arm switches are turned off. In the energization period P3, only the W-phase upper arm switch $Q_{WH}$ is subjected to switching control at a predetermined switching duty ratio. In the energization period P3, drive current flows to the W-phase coil 23w and the V-phase coil 23v from the W-phase terminal 22w toward the V-phase terminal 22v. That is, energization phases in the energization period P3 are the W phase and the V phase.

In FIG. 3, an energization period P4 from time t13 to time t14 indicates a period in which each arm switch is subjected to switching control based on the energization pattern PA4. In the energization period P4, the W-phase upper arm switch $Q_{WH}$ and the U-phase lower arm switch $Q_{UL}$ are turned on, and the remaining arm switches are turned off. Also in the energization period P4, only the W-phase upper arm switch $Q_{WH}$ is subjected to switching control at a predetermined switching duty ratio. In the energization period P4, drive current flows to the W-phase coil 23w and the U-phase coil 23u from the W-phase terminal 22w toward the U-phase terminal 22u. That is, energization phases in the energization period P4 are the W phase and the U phase.

In FIG. 3, an energization period P5 from time t14 to time t15 indicates a period in which each arm switch is subjected to switching control based on the energization pattern PA5. In the energization period P5, the V-phase upper arm switch $Q_{VH}$ and the U-phase lower arm switch $Q_{UL}$ are turned on, and the remaining arm switches are turned off. In the energization period P5, only the V-phase upper arm switch $Q_{VH}$ is subjected to switching control at a predetermined switching duty ratio. In the energization period P5, the power supply current flows to the V-phase coil 23v and the U-phase coil 23u from the V-phase terminal 22v toward the U-phase terminal 22u. That is, energization phases in the energization period P5 are the V phase and the U phase.

In FIG. 3, an energization period P6 from time t15 to time t16 indicates a period in which each arm switch is subjected to switching control based on the energization pattern PA6. In the energization period P6, the V-phase upper arm switch $Q_{VH}$ and the W-phase lower arm switch $Q_{WL}$ are turned on, and the remaining arm switches are turned off. Also in the energization period P6, only the V-phase upper arm switch $Q_{VH}$ is subjected to switching control at a predetermined switching duty ratio. In the energization period P6, the power supply current flows to the V-phase coil 23v and the W-phase coil 23w from the V-phase terminal 22v toward the W-phase terminal 22w. That is, energization phases in the energization period P6 are the V phase and the W phase.

By switching control of each arm switch according to the above-described six energization patterns, a rotating magnetic field that rotates the shaft 21 of the three-phase motor 20 by 360° in a certain direction is generated. As a result, in a period from time t10 to time t16, the shaft 21 of the three-phase motor 20 rotates by 360° in a certain direction. In other words, the shaft 21 of the three-phase motor 20 rotates by 60° in a certain direction during each of the energization period P1 to the energization period P6.

A speed at which an energization pattern is switched, that is, a speed at which an energization phase is switched, is referred to as a commutation frequency Fs. The unit of the commutation frequency Fs is "Hz". When a period during which switching control is performed in one energization pattern is P (seconds), the commutation frequency Fs is expressed by "Fs=1/P".

FIG. 3 illustrates a waveform of voltage appearing at the U-phase terminal 22u, the V-phase terminal 22v, and the W-phase terminal 22w of the three-phase motor 20. In FIG. 3, "Vu" is U-phase terminal voltage appearing at the U-phase terminal 22u. "Vv" is V-phase terminal voltage appearing at the V-phase terminal 22v. "Vw" is W-phase terminal voltage appearing at the W-phase terminal 22w. Note that an actual waveform of the U-phase terminal voltage Vu, the V-phase terminal voltage Vv, and the W-phase terminal voltage Vw has the same duty ratio as a switching duty ratio, but FIG. 3 illustrates only an envelope of a voltage waveform for convenience.

The U-phase terminal voltage Vu has an effective voltage value determined by a switching duty ratio in the energization periods P1 and P2, and has a value of a ground level, that is, 0 V in the energization periods P4 and P5. The V-phase terminal voltage Vv has an effective voltage value determined by a switching duty ratio in the energization periods P5 and P6, and has 0 V in the energization periods P2 and P3. The W-phase terminal voltage Vw has an effective voltage value determined by a switching duty ratio in the energization periods P3 and P4, and has 0 V in the energization periods P1 and P6. As described above, in the sensorless 120° energization system, a phase in which drive voltage necessary for driving the three-phase motor 20 is applied is switched every 120°.

Although drive current does not flow through the U-phase coil 23u in the energization period P3, energy accumulated in the U-phase coil 23u causes reflux current to flow through the U-phase coil 23u via a body diode of the U-phase lower arm switch $Q_{UL}$ for a certain period of time. As a result, a ringing phenomenon in which the U-phase terminal voltage Vu has 0 V for a certain period of time from the start point of the period P3 occurs. After the above, the U-phase terminal voltage Vu matches induced voltage generated in the U-phase coil 23u. In the energization period P3, induced voltage intersects neutral point voltage $V_N$, which is voltage at the neutral point N, from the high voltage side to the low voltage side at the center of the energization period P3, that is, at a timing when the three-phase motor 20 rotates by 30° from a start point of the energization period P3.

Similarly, drive current does not flow through the U-phase coil 23u in the energization period P6, but energy accumulated in the U-phase coil 23u causes reflux current to flow through the U-phase coil 23u via a body diode of the U-phase upper arm switch $Q_{UH}$ for a certain period of time. As a result, a ringing phenomenon in which the U-phase terminal voltage Vu becomes the DC power supply voltage $V_M$ for a certain period of time from a start point of the energization period P6 occurs. After the above, the U-phase terminal voltage Vu matches induced voltage generated in the U-phase coil 23u. In the energization period P6, induced voltage intersects the neutral point voltage $V_N$ from the low voltage side to the high voltage side at the center of the energization period P6, that is, at a timing when the three-phase motor 20 rotates by 30° from a start point of the energization period P6.

As described above, while the three-phase motor 20 rotates by 360°, induced voltage is exposed to the U-phase terminal 22u only in the energization periods P3 and P6. According to a similar principle, while the three-phase motor 20 rotates by 360°, induced voltage is exposed to the V-phase terminal 22v only in the energization periods P1 and P4, and induced voltage is exposed to the W-phase terminal 22w only in the energization periods P2 and P5. In the sensorless 120° energization system, in order to detect a phase of the three-phase motor 20, it is necessary to detect a zero-cross point which is a point at which the neutral point voltage $V_N$ and induced voltage intersect.

In FIG. 3, "Zu" is a U-phase zero-cross point detection signal that becomes a low level at a timing when induced voltage exposed to the U-phase terminal 22u becomes equal to or less than the neutral point voltage $V_N$, and becomes a high level at a timing when induced voltage exposed to the U-phase terminal 22u becomes higher than the neutral point voltage $V_N$. "Zv" is a V-phase zero-cross point detection signal that becomes a low level at a timing when induced voltage exposed to the V-phase terminal 22v becomes equal to or less than the neutral point voltage $V_N$, and becomes a high level at a timing when induced voltage exposed to the V-phase terminal 22v becomes higher than the neutral point voltage $V_N$. "Zw" is a W-phase zero-cross point detection signal that becomes a low level at a timing when induced voltage exposed to the W-phase terminal 22w becomes equal to or less than the neutral point voltage $V_N$, and becomes a high level at a timing when induced voltage exposed to the W-phase terminal 22w becomes higher than the neutral point voltage $V_N$.

In FIG. 3, "Hu" is a U-phase phase detection signal having a phase delay of 30° with respect to the U-phase zero-cross point detection signal Zu. "Hv" is a V-phase phase detection signal having a phase delay of 30° with respect to the V-phase zero-cross point detection signal Zv. "Hw" is a W-phase phase detection signal having a phase delay of 30° with respect to the W-phase zero-cross point detection signal Zw.

Note that the three-phase motor 20 rotates by 60° during time between two zero-cross points adjacent to each other on a time axis. For this reason, by measuring time between two zero-cross points adjacent on a time axis and delaying the U-phase zero-cross point detection signal Zu by half a result of the measurement, the U-phase phase detection signal Hu having a phase delay of 30° with respect to the U-phase zero-cross point detection signal Zu can be generated. The V-phase phase detection signal Hv and the W-phase phase detection signal Hw can also be generated by a similar method.

FIG. 3 shows that levels of the U-phase phase detection signal Hu, the V-phase phase detection signal Hv, and the W-phase phase detection signal Hw regularly change depending on the six energization patterns. Hereinafter, a pattern in which the levels of the U-phase phase detection signal Hu, the V-phase phase detection signal Hv, and the W-phase phase detection signal Hw change depending on an energization pattern is referred to as a phase pattern. As illustrated in FIG. 2, the phase pattern of the sensorless 120° energization system includes six phase patterns PB1, PB2, PB3, PB4, PB5, and PB6. In FIG. 2, between "1" and "0" arranged in columns of "$H_U$", "$H_V$", and "$H_W$", "1" means that a corresponding phase detection signal is at a high level, and "0" means that a corresponding phase detection signal is at a low level.

In the sensorless 120° energization system, the phase pattern is recognized for each energization period based on three of the phase detection signals Hu, Hv, and Hw, and an energization pattern to be used in a next energization period is determined based on a recognition result of the phase pattern. Then, an energization pattern is switched to a next energization pattern at a timing when the phase pattern changes.

As illustrated in FIG. 3, for example, in the energization period P1, it is recognized that the phase pattern in the energization period P1 is the phase pattern PB1 from the phase detection signals Hu, Hv, and Hw. Since the phase pattern of the energization period P1 is the phase pattern PB1, the energization pattern PA2 is determined as an energization pattern to be used in the next energization period P2. Then, the energization pattern is switched from the energization pattern PA1 to the energization pattern PA2 at a timing when the phase pattern PB1 changes, that is, at a timing when a falling edge occurs in the V-phase phase detection signal Hv.

In the sensorless 120° energization system, the switching of an energization pattern as described above is performed at intervals of 60° in synchronization with the phase detection signals Hu, Hv, and Hw generated using induced voltage generated in the three-phase motor 20, so that rotation of the three-phase motor 20 can be controlled without a position sensor such as a Hall sensor. Hereinafter, performing energization control of the three-phase motor 20 in synchronization with the phase detection signals Hu, Hv, and Hw generated using induced voltage generated in the three-phase motor 20 is referred to as "sensorless synchronization control".

The basic principle of the sensorless 120° energization system is described above. As understood from the above description, in order to generate the phase detection signals Hu, Hv, and Hw in the sensorless 120° energization system, it is necessary to detect a zero-cross point which is a point at which the neutral point voltage $V_N$ of the three-phase motor 20 and induced voltage intersect.

Figure 4:
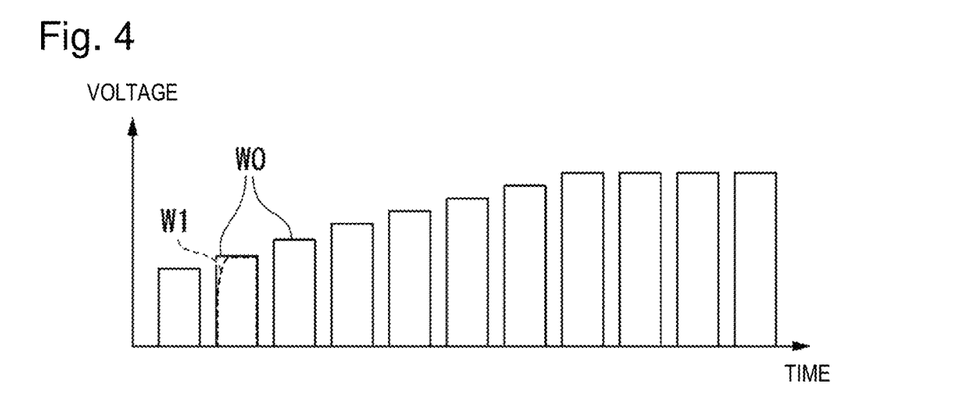
FIG. 4 is a diagram illustrating waveforms of induced voltage appearing at each of three-phase terminal voltages Vu, Vv, and Vw in a case where sensorless synchronization control of a three-phase motor 20 is performed at a high duty ratio.

FIG. 4 is a diagram illustrating waveforms of induced voltage appearing at each of the three-phase terminal voltages Vu, Vv, and Vw in a case where the sensorless synchronization control of the three-phase motor 20 is performed at a high duty ratio. Although only an envelope of a voltage waveform is illustrated in FIG. 3 for convenience, as illustrated in FIG. 4, a waveform of actually observed induced voltage has the same duty ratio as an output duty ratio (switching duty ratio) with respect to the three-phase motor 20.

In FIG. 4, a waveform W0 is a waveform of induced voltage obtained by theoretical calculation. That is, the waveform W0 is a waveform indicating a temporal change in a theoretical voltage value of induced voltage. Hereinafter, the waveform W0 is referred to as "theoretical waveform W0 of induced voltage". As illustrated in FIG. 4, the theoretical waveform W0 of induced voltage has a rectangular waveform.

Further, in FIG. 4, a waveform W1 is a waveform of induced voltage detected by the motor control device 10. The three-phase terminal voltages Vu, Vv, and Vw taken into the motor control device 10 are converted into digital data via an A/D converter. As described above, in the present description, digital data obtained from hardware such as an A/D converter built in the motor control device 10 is referred to as "detection value". That is, the waveform W1 is a waveform indicating a temporal change in the detection value of induced voltage. Hereinafter, the waveform W1 is referred to as "detection waveform W1 of induced voltage".

As illustrated in FIG. 4, in a case where the sensorless synchronization control of the three-phase motor 20 is performed at a high duty ratio, the detection waveform W1 of induced voltage substantially matches with the theoretical waveform W0. In this case, since a detection timing of a zero-cross point at which the neutral point voltage $V_N$ of the three-phase motor 20 and induced voltage intersect substantially matches with an ideal timing, sensorless control of the three-phase motor 20 can be stably performed.

Figure 5:
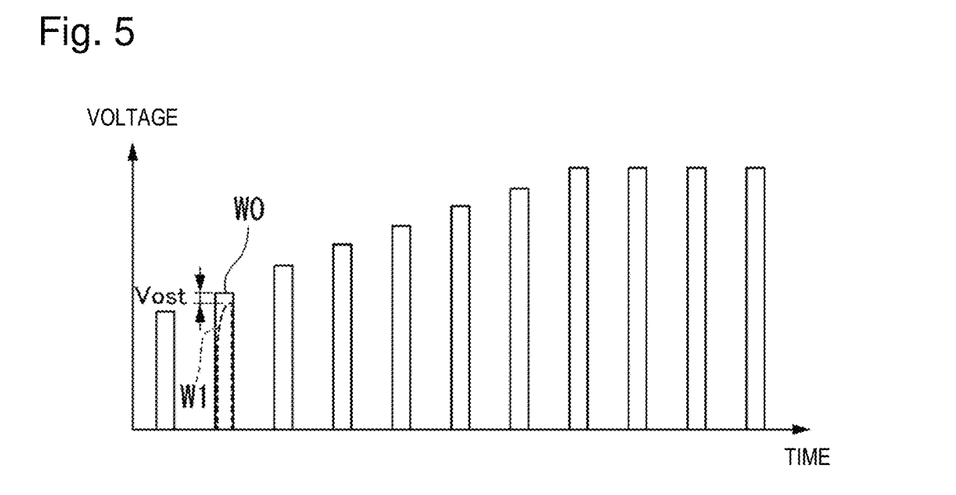
FIG. 5 is a diagram illustrating waveforms of induced voltage appearing at each of the three-phase terminal voltages Vu, Vv, and Vw in a case where sensorless synchronization control of the three-phase motor 20 is performed at a low duty ratio.

FIG. 5 is a diagram illustrating waveforms of induced voltage appearing at each of the three-phase terminal voltages Vu, Vv, and Vw in a case where the sensorless synchronization control of the three-phase motor 20 is performed at a low duty ratio. As illustrated in FIG. 5, in a case where the sensorless synchronization control of the three-phase motor 20 is performed at a low duty ratio, the detection waveform W1 of induced voltage becomes a waveform having large distortion as compared with the theoretical waveform W0 due to a response delay of hardware in the motor control device 10 or the like.

That is, in a case where the sensorless synchronization control of the three-phase motor 20 is performed at a low duty ratio, there is a possibility that a detection value of induced voltage appearing in each of the three-phase terminal voltages Vu, Vv, and Vw becomes lower than a theoretical voltage value by offset voltage Vost. In this case, a detection timing of a zero-cross point at which the neutral point voltage $V_N$ of the three-phase motor 20 and induced voltage intersect deviates from an ideal timing, and as a result, there is a possibility that it becomes difficult to stably perform sensorless control of the three-phase motor 20.

The motor control device 10 of the present embodiment has a configuration that solves the above technical problem.

Hereinafter, the first voltage detection circuit 12, the second voltage detection circuit 13, the control unit 14, and the storage unit 15 included in the motor control device 10 according to the present embodiment will be described on the premise of the basic principle and technical problem of the sensorless 120° energization method described above.

The first voltage detection circuit 12 is a circuit that detects terminal voltage of three phases of the three-phase motor 20. The first voltage detection circuit 12 is electrically connected to each of the U-phase terminal 22u, the V-phase terminal 22v, and the W-phase terminal 22w of the three-phase motor 20. As an example, the first voltage detection circuit 12 includes a resistance voltage divider circuit. The first voltage detection circuit 12 outputs voltage of the U-phase terminal 22u to the control unit 14 as the U-phase terminal voltage Vu. The first voltage detection circuit 12 outputs voltage of the V-phase terminal 22v to the control unit 14 as the V-phase terminal voltage Vv. The first voltage detection circuit 12 outputs voltage of the W-phase terminal 22w to the control unit 14 as the W-phase terminal voltage Vw.

The second voltage detection circuit 13 is a circuit that detects the DC power supply voltage $V_M$ input to the drive circuit 11. As an example, the second voltage detection circuit 13 is a resistance voltage divider circuit including a first resistance element 13a and a second resistance element 13b. A first end of the first resistance element 13a is electrically connected to a positive electrode terminal of the DC power supply 200. A second end of the first resistance element 13a is electrically connected to a first end of the second resistance element 13b and the control unit 14. A second end of the second resistance element 13b is electrically connected to a negative electrode terminal of the DC power supply 200. The second voltage detection circuit 13 outputs inter-terminal voltage Vin of the second resistance element 13b to the control unit 14 as the DC power supply voltage $V_M$.

The control unit 14 is, for example, a microprocessor such as a microcontroller unit (MCU). The rotation speed command signal CS output from a host control device (not illustrated) is input to the control unit 14. The rotation speed command signal CS is a signal instructing a target rotation speed of the three-phase motor 20. The control unit 14 is communicably connected to the storage unit 15 via a communication bus (not illustrated). Although details will be described later, the control unit 14 executes processing of rotating the three-phase motor 20 at a target rotation speed instructed by the rotation speed command signal CS according to a program stored in advance in the storage unit 15.

The control unit 14 incorporates a plurality of A/D converters. The three-phase terminal voltages Vu, Vv, and Vw input from the first voltage detection circuit 12 to the control unit 14 and the DC power supply voltage $V_M$ input from the second voltage detection circuit 13 to the control unit 14 are converted into digital data via an A/D converter. The control unit 14 acquires digital data obtained from an A/D converter as a detection value of the three-phase terminal voltages Vu, Vv, and Vw and acquires the digital data as a detection value of the DC power supply voltage $V_M$.

The control unit 14 detects a point at which a first voltage value Vobs, which is a detection value of each of the three-phase terminal voltages Vu, Vv, and Vw, intersects a predetermined zero-cross determination level as a zero-cross point, and controls the drive circuit 11 on the basis of a detection result of the zero-cross point. Note that the zero-cross determination level is the neutral point voltage $V_N(=V_M/2)$ of the three-phase motor 20.

In the present embodiment, in order to solve the above technical problem, the control unit 14 corrects the first voltage value Vobs by multiplying the first voltage value Vobs by a first coefficient K1 inversely proportional to an output duty ratio Dout in a case where the output duty ratio Dout with respect to the three-phase motor 20 is equal to or less than a predetermined threshold. For example, in a case where the output duty ratio Dout is equal to or less than a first threshold Dth1, the control unit 14 calculates the first coefficient K1 by multiplying a value obtained by subtracting the output duty ratio Dout from the first threshold Dth1 by a first correction value G1. The first coefficient K1 is expressed by Equation (1) below. As an example, the first threshold Dth1 is 20%.

$$K1=(Dth1-Dout)\times G1 \quad (1)$$

Further, in the present embodiment, the control unit 14 corrects the first voltage value Vobs by multiplying the first voltage value Vobs by a second coefficient K2 proportional to the second voltage value Vin that is a detection value of the DC power supply voltage $V_M$ and the first coefficient K1. For example, the control unit 14 calculates the second coefficient K2 by multiplying the second voltage value Vin by a third correction value G3. The second coefficient K2 is expressed by Equation (2) below.

$$K2=Vin\times G3 \quad (2)$$

That is, in the present embodiment, the control unit 14 corrects the first voltage value Vobs based on Equation (3)

below in a case where the output duty ratio Dout is equal to or less than the first threshold Dth1. In Equation (3) below, Vcal is the corrected first voltage value Vobs.

$$Vcal = Vobs \times K2 \times K1 \quad (3)$$

As described with reference to FIGS. 4 and 5, in a case where the output duty ratio Dout with respect to the three-phase motor 20 is equal to or less than a predetermined threshold, the first voltage value Vobs, which is a detection value of each of the three-phase terminal voltages Vu, Vv, and Vw, becomes lower than an ideal voltage value by the offset voltage Vost due to a response delay of hardware in the motor control device 10 or the like. In this case, by multiplying the first voltage value Vobs by the first coefficient K1 inversely proportional to the output duty ratio Dout, as the output duty ratio Dout decreases, the first voltage value Vobs increases and can be made closer to an ideal voltage value.

Further, an ideal voltage value of the first voltage value Vobs increases in proportion to the DC power supply voltage $V_M$. For this reason, by multiplying the first voltage value Vobs by the second coefficient K2 proportional to the second voltage value Vin, which is a detection value of the DC power supply voltage $V_M$ in addition to the first coefficient K1, the first voltage value Vobs can be made closer to an ideal voltage value more accurately. As a result, a detection timing of a zero-cross point at which the first voltage value Vobs (Vcal), which is a detection value of each of the three-phase terminal voltages Vu, Vv, and Vw, intersects a zero-cross determination level can be substantially matched with an ideal timing, and an energization pattern can be switched at intervals of 60° with high accuracy.

Note that the first correction value G1 and the third correction value G3 are values determined in advance by experiment, simulation, or the like. The first correction value G1 and the third correction value G3 are stored in the storage unit 15 in advance. For example, the first correction value G1 is a value of one or more, and the third correction value G3 is a value of zero or more and less than one.

The control unit 14 generates the U-phase zero-cross point detection signal Zu based on a detection result of a zero-cross point at which the first voltage value Vobs of the U-phase terminal voltage Vu intersects a zero-cross determination level, and generates the U-phase phase detection signal Hu having a phase delay of 30° with respect to the U-phase zero-cross point detection signal Zu.

Further, the control unit 14 generates the V-phase zero-cross point detection signal Zv on the basis of a detection result of a zero-cross point at which the first voltage value Vobs of the V-phase terminal voltage Vv intersects a zero-cross determination level, and generates the V-phase phase detection signal Hv having a phase delay of 30° with respect to the V-phase zero-cross point detection signal Zv.

Further, the control unit 14 generates the W-phase zero-cross point detection signal Zw on the basis of a detection result of a zero-cross point at which the first voltage value Vobs of the W-phase terminal voltage Vw intersects a zero-cross determination level, and generates the W-phase phase detection signal Hw having a phase delay of 30° with respect to the W-phase zero-cross point detection signal Zw.

The control unit 14 switches an energization pattern based on the phase detection signals Hu, Hv, and Hw, determines the output duty ratio (switching duty ratio) Dout necessary for matching an actual rotation speed of the three-phase motor 20 with a target rotation speed, and performs switching control of each arm switch with the determined output duty ratio Dout. As a result, three-phase AC voltage that matches an actual rotation speed of the motor 20 with a target rotation speed is supplied from the drive circuit 11 to the three-phase motor 20.

The storage unit 15 includes a nonvolatile memory that stores a program, various types of setting data, and the like necessary for causing the control unit 14 to execute various types of processing, and a volatile memory used as a temporary storage destination of data when the control unit 14 executes various types of processing. The nonvolatile memory is, for example, an electrically erasable programmable read-only memory (EEPROM), a flash memory, or the like. The volatile memory is, for example, a random access memory (RAM) or the like.

The storage unit 15 stores various types of data necessary for controlling the three-phase motor 20 by the sensorless 120° energization system. For example, the storage unit 15 stores in advance the energization pattern and the phase pattern illustrated in FIG. 2. Further, the storage unit 15 stores the first correction value G1 and the third correction value G3 in advance.

Next, operation of the motor control device 10 configured as described above will be described.

Figure 6:
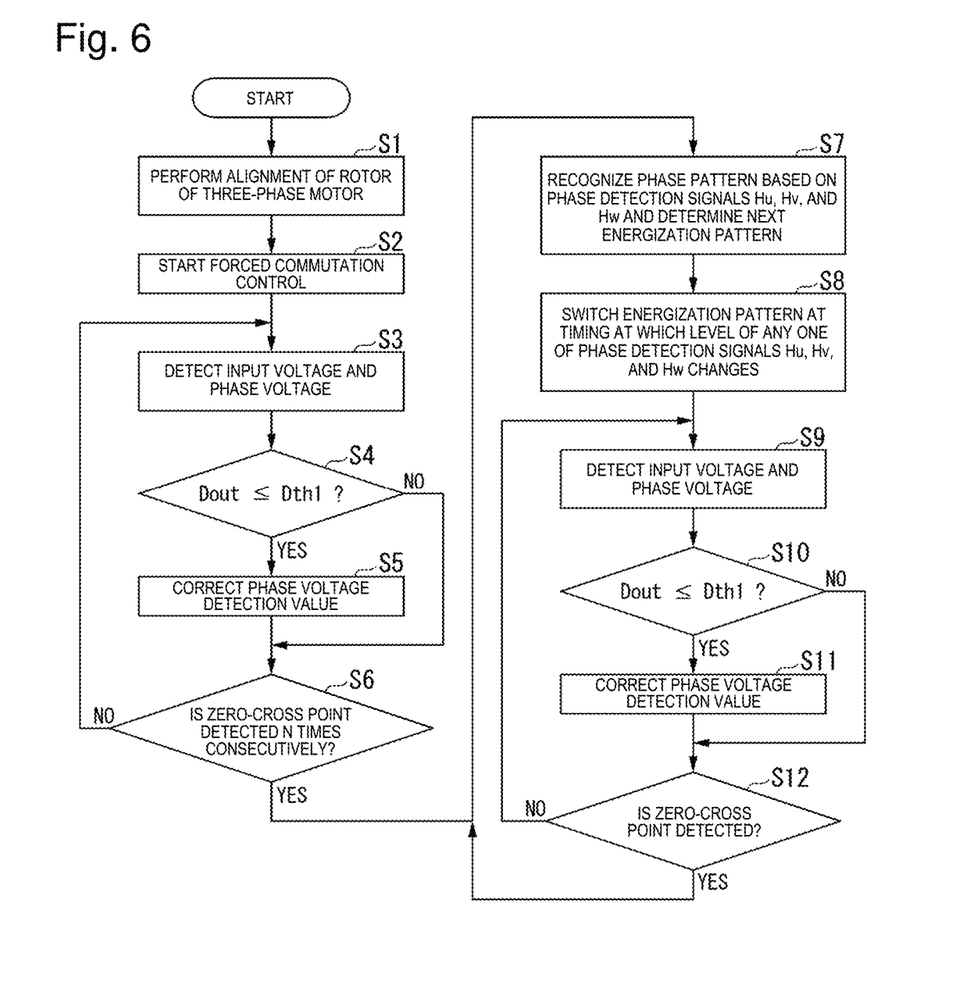
FIG. 6 is a flowchart illustrating each piece of processing included in motor control executed by a control unit 14.

FIG. 6 is a flowchart illustrating each piece of processing included in motor control executed by the control unit 14. The control unit 14 starts processing for motor control illustrated in FIG. 6 when a target rotation speed is instructed by the rotation speed command signal CS input from a host control device after power is turned on.

As illustrated in FIG. 6, when starting motor control as the three-phase motor 20 is in a stopped state, the control unit 14 first performs alignment of the rotor of the three-phase motor 20 (Step S1), and starts forced commutation control of the three-phase motor 20 after completion of the alignment of the rotor (Step S2).

In a case where the three-phase motor 20 is started in the sensorless 120° energization system, until a rotation speed of the three-phase motor 20 reaches a limit minimum rotation speed at which induced voltage that allows detection of a zero-cross point is generated, the control unit 14 cannot generate the phase detection signals Hu, Hv, and Hw and cannot perform the sensorless synchronization control. For this reason, in a case where the three-phase motor 20 is started in the sensorless 120° energization system, it is necessary to perform energization control of the three-phase motor 20 according to a predetermined start sequence until a rotation speed of the three-phase motor 20 reaches the limit minimum rotation speed.

As an example of the start sequence, a start sequence in which, after a position of the rotor is aligned to a specific position (position corresponding to one of motor control states) by DC excitation performed on the three-phase motor 20 for a predetermined period of time, forced commutation control is performed to forcibly switch an energization phase (energization pattern) at a predetermined forced commutation frequency while predetermined drive voltage is applied to the energization phase is generally known. Since the processing in Steps S1 and S2 is included in the publicly-known start sequence as described above, detailed description of the processing will be omitted.

When the forced commutation control is started, a rotation speed of the three-phase motor 20 gradually increases toward a rotation speed corresponding to a forced commutation frequency. When the forced commutation control is started, the control unit 14 acquires the first voltage value Vobs which is a detection value of terminal voltage of a phase in which induced voltage appears in a current energization period and the second voltage value Vin which is a detection value of the DC power supply voltage $V_M$ (Step S3).

Then, the control unit 14 determines whether or not the output duty ratio Dout in a current energization period is equal to or less than the first threshold Dth1 (Step S4). In a case where the output duty ratio Dout in a current energization period is equal to or less than the first threshold Dth1 (Step S4: Yes), the control unit 14 corrects the first voltage value Vobs acquired in Step S3 based on Equations (1), (2), and (3) (Step S5).

Specifically, in Step S5, the control unit 14 calculates the first coefficient K1 by substituting the output duty ratio Dout in a current energization period, the first threshold Dth1, and the first correction value G1 stored in the storage unit 15 into Equation (1) above. Further, the control unit 14 calculates the second coefficient K2 by substituting the second voltage value Vin acquired in Step S3 and the third correction value G3 stored in the storage unit 15 into Equation (2) above. Then, the control unit 14 calculates the corrected first voltage value Vobs (Vcal) by substituting the first voltage value Vobs acquired in Step S3, the first coefficient K1, and the second coefficient K2 into Equation (3) above.

After executing the processing of Step S5, the control unit 14 proceeds to Step S6. On the other hand, in a case where the output duty ratio Dout in a current energization period is larger than the first threshold Dth1 (Step S4: No), the control unit 14 skips Step S5 and proceeds to Step S6.

The control unit 14 starts processing of detecting a zero-cross point at which the first voltage value Vobs, which is a detection value of terminal voltage of a phase at which induced voltage appears in a current energization period, intersects a zero-cross determination level, and determines whether or not the zero-cross point is detected n times consecutively (Step S6). In the above, n is an integer of two or more.

Note that the control unit 14 starts processing of generating the zero-cross point detection signals Zu, Zv, and Zw of each phase based on a detection result for a zero-cross point of each phase, and processing of generating the phase detection signals Hu, Hv, and Hw of each phase based on the zero-cross point detection signals Zu, Zv, and Zw of each phase.

When a rotation speed of the three-phase motor 20 reaches the limit minimum rotation speed after start of the forced commutation control, relatively large induced voltage starts to appear in the terminal voltages Vu, Vv, and Vw of each phase, so that a zero-cross point starts to be detected. In a case where it is determined in Step S6 that a zero-cross point is detected n times consecutively, it is estimated that the three-phase motor 20 starts to stably rotate at a rotation speed equal to or more than the limit minimum rotation speed.

In a case of "No" in Step S6, that is, in a case where the number of times of consecutive detection of a zero-cross point is less than n, it is estimated that the three-phase motor 20 is yet to start to stably rotate at a rotation speed equal to or more than the limit minimum rotation speed. In this case, the control unit 14 returns to the processing of Step S3.

On the other hand, in a case of "Yes" in Step S6, that is, in a case where the number of times of consecutive detection of a zero-cross point reaches n, it is estimated that the three-phase motor 20 starts to stably rotate at a rotation speed equal to or more than the limit minimum rotation speed. In this case, the control unit 14 recognizes a phase pattern of a current energization period based on the phase detection signals Hu, Hv, and Hw, and determines an energization pattern to be used in a next energization period based on the recognition result of a phase pattern (Step S7).

For example, as illustrated in FIG. 3, the number of times of consecutive detection of a zero-cross point is assumed to reach n when a zero-cross point at which the first voltage value Vobs, which is a detection value of the V-phase terminal voltage Vv where induced voltage appears, intersects a zero-cross determination level is detected in the energization period P1.

As described above, in a case where the number of times of consecutive detection of a zero-cross point reaches n in the energization period P1, the control unit 14 recognizes a phase pattern of the current energization period P1 based on the phase detection signals Hu, Hv, and Hw. In the energization period P1, the phase detection signals Hu and Hv are at a high level ("1"), and the phase detection signal Hw is at a low level ("0"). In this case, the control unit 14 recognizes that a phase pattern of the current energization period P1 is PB1 by referring to the phase pattern (see FIG. 2) stored in the storage unit 15.

Then, the control unit 14 determines an energization pattern to be used in a next energization period based on a recognition result of a phase pattern. For example, as described above, in a case of recognizing that a phase pattern of the current energization period P1 is PB1, the control unit 14 determines the energization pattern PA2 as an energization pattern to be used in a next energization period by referring to an energization pattern (see FIG. 2) stored in the storage unit 15.

After determining an energization pattern to be used in a next energization period, the control unit 14 switches an energization pattern to the energization pattern determined in Step S7 at a timing when a level of any one of the phase detection signals Hu, Hv, and Hw changes (Step S8). For example, in a case where the number of times of consecutive detection of a zero-cross point reaches n in the energization period P1 as described above, when the three-phase motor 20 rotates by 30° from a zero-cross detection timing based on induced voltage appearing in the V-phase terminal voltage Vv, a level of the phase detection signal Hv changes from a high level to a low level (see time t11 in FIG. 3). Therefore, in this case, the control unit 14 switches an energization pattern to the energization pattern PA2 determined in Step S7 at a timing (time t11) when a falling edge occurs in the phase detection signal Hv.

Note that the control unit 14 switches an energization pattern, determines the output duty ratio Dout necessary for matching an actual rotation speed of the three-phase motor 20 with a target rotation speed, and performs switching control of each arm switch with the determined output duty ratio Dout. For example, in a case where an energization pattern is switched to the energization pattern PA2 as described above, the control unit 14 controls the U-phase upper arm switch $Q_{UH}$ and the V-phase lower arm switch $Q_{VL}$ to be turned on, and controls the remaining arm switches to be turned off (see FIG. 2). In a case of the energization pattern PA2, the control unit 14 performs switching control with the determined output duty ratio Dout only for the U-phase upper arm switch $Q_{UH}$ (see FIG. 3). As a result, three-phase AC voltage that matches an actual rotation speed of the three-phase motor 20 with a target rotation speed is supplied from the drive circuit 11 to the three-phase motor 20.

After the above, the control unit 14 rotates the three-phase motor 20 at a target rotation speed by performing switching of an energization pattern and switching control of each arm switch at intervals of 60° in synchronization with the phase detection signals Hu, Hv, and Hw. As described above, in Step S7 and following steps, the control unit 14 starts the sensorless synchronization control for controlling the three-phase motor 20 in synchronization with the phase detection signals Hu, Hv, and Hw.

When the sensorless synchronization control is started, a rotation speed of the three-phase motor 20 gradually increases toward a target rotation speed. When the sensorless synchronization control is started, the control unit 14 acquires the first voltage value Vobs which is a detection value of terminal voltage of a phase in which induced voltage appears in a current energization period and the second voltage value Vin which is a detection value of the DC power supply voltage $V_M$ (Step S9).

Then, the control unit 14 determines whether or not the output duty ratio Dout in a current energization period is equal to or less than the first threshold Dth1 (Step S10). In a case where the output duty ratio Dout in a current energization period is equal to or less than the first threshold Dth1 (Step S10: Yes), the control unit 14 corrects the first voltage value Vobs acquired in Step S9 based on Equations (1), (2), and (3) (Step S11).

Specifically, in Step S11, the control unit 14 calculates the first coefficient K1 by substituting the output duty ratio Dout in a current energization period, the first threshold Dth1, and the first correction value G1 stored in the storage unit 15 into Equation (1) above. Further, the control unit 14 calculates the second coefficient K2 by substituting the second voltage value Vin acquired in Step S9 and the third correction value G3 stored in the storage unit 15 into Equation (2) above. Then, the control unit 14 calculates the corrected first voltage value Vobs (Vcal) by substituting the first voltage value Vobs acquired in Step S9, the first coefficient K1, and the second coefficient K2 into Equation (3) above.

After executing the processing of Step S11, the control unit 14 proceeds to Step S12. On the other hand, in a case where the output duty ratio Dout in a current energization period is larger than the first threshold Dth1 (Step S10: No), the control unit 14 skips Step S11 and proceeds to Step S12.

The control unit 14 determines whether or not a zero-cross point at which the first voltage value Vobs, which is a detection value of terminal voltage of a phase at which induced voltage appears in a current energization period, intersects a zero-cross determination level is detected (Step S12). In a case where the zero-cross point is not detected (Step S12: No), the control unit 14 returns to Step S9 described above. On the other hand, in a case where the zero-cross point is detected (Step S12: Yes), the control unit 14 returns to Step S7 described above.

As described above, after the sensorless synchronization control is started, the control unit 14 repeats the processing from Step S7 to Step S12, so that three-phase AC voltage that matches an actual rotation speed of the three-phase motor 20 with a target rotation speed is supplied from the drive circuit 11 to the three-phase motor 20. As a result, a rotation speed of the three-phase motor 20 reaches the target rotation speed.

As described above, the motor control device 10 according to the present embodiment includes the drive circuit 11 that converts the DC power supply voltage $V_M$ into three-phase AC voltage and supplies the three-phase AC voltage to the three-phase motor 20, the first voltage detection circuit 12 that detects the three-phase terminal voltages Vu, Vv, and Vw of the three-phase motor 20, and the control unit 14 that detects a point at which the first voltage value Vobs of each of the three-phase terminal voltages Vu, Vv, and Vw intersects a predetermined zero-cross determination level as a zero-cross point and controls the drive circuit 11 based on a detection result of the zero-cross point. When the output duty ratio Dout with respect to the three-phase motor 20 is equal to or less than a predetermined threshold, the control unit 14 corrects the first voltage value Vobs by multiplying the first voltage value Vobs by the first coefficient K1 inversely proportional to the output duty ratio Dout.

In a case where the output duty ratio Dout with respect to the three-phase motor 20 is equal to or less than a predetermined threshold, the first voltage value Vobs, which is a detection value of each of the three-phase terminal voltages Vu, Vv, and Vw, becomes lower than an ideal voltage value by the offset voltage Vost due to a response delay of hardware in the motor control device 10 or the like. In this case, by multiplying the first voltage value Vobs by the first coefficient K1 inversely proportional to the output duty ratio Dout, as the output duty ratio Dout decreases, the first voltage value Vobs increases and can be made closer to an ideal voltage value. As a result, a zero-cross point detection timing can be substantially matched with an ideal timing, and an energization pattern can be switched with high accuracy at intervals of 60°. Therefore, according to the present embodiment, the sensorless control of the three-phase motor 20 can be stably performed even in a case where the three-phase motor 20 is rotated at a low duty ratio.

Further, in the present embodiment, in a case where the output duty ratio Dout is equal to or less than the first threshold Dth1, the control unit 14 calculates the first coefficient K1 by multiplying a value obtained by subtracting the output duty ratio Dout from the first threshold Dth1 by the first correction value G1.

By using the first coefficient K1 calculated in this manner, the first voltage value Vobs can be made closer to an ideal voltage value more accurately, so that a zero-cross point detection timing can be more accurately matched with an ideal timing.

Further, the motor control device 10 of the present embodiment further includes the second voltage detection circuit 13 that detects the DC power supply voltage $V_M$ input to the drive circuit 11, and the control unit 14 corrects the first voltage value Vobs by multiplying the first voltage value Vobs by the second coefficient K2 proportional to the second voltage value Vin, which is a detection value of the DC power supply voltage $V_M$, and the first coefficient K1.

An ideal voltage value of the first voltage value Vobs increases in proportion to the DC power supply voltage $V_M$. For this reason, by multiplying the first voltage value Vobs by the second coefficient K2 proportional to the second voltage value Vin, which is a detection value of the DC power supply voltage $V_M$ in addition to the first coefficient K1, the first voltage value Vobs can be made closer to an ideal voltage value more accurately. As a result, a zero-cross point detection timing can be more accurately matched with an ideal timing.

Further, in the present embodiment, the control unit 14 calculates the second coefficient K2 by multiplying the second voltage value Vin by a third correction value G3.

By using the second coefficient K2 calculated in this manner, the first voltage value Vobs can be made closer to an ideal voltage value more accurately, so that a zero-cross point detection timing can be more accurately matched with an ideal timing.

The present invention is not limited to the above embodiment, and the configurations described in the present description can be appropriately combined within a range not conflicting with one another.

In the embodiment described above, an aspect in which the control unit 14 calculates the first coefficient K1 by multiplying the first correction value G1 by a value obtained by subtracting the output duty ratio Dout from the first threshold Dth1 in a case where the output duty ratio Dout is equal to or less than the first threshold Dth1 is described, but the present invention is not limited to this aspect.

For example, in a case where the output duty ratio Dout is equal to or less than the first threshold Dth1 and larger than a second threshold Dth2, the control unit 14 may calculate the first coefficient K1 by multiplying a value obtained by subtracting the output duty ratio Dout from the first threshold Dth1 by the first correction value G1. Then, in a case where the output duty ratio Dout is equal to or less than the second threshold Dth2, the control unit 14 may calculate the first coefficient K1 by multiplying a value obtained by subtracting the output duty ratio Dout from the second threshold Dth2 by the second correction value G2.

The second threshold Dth2 is smaller than the first threshold Dth1. As an example, the first threshold Dth1 is 20%, and the second threshold Dth2 is 15%. The second correction value G2 is a value determined in advance by experiment, simulation, or the like. The second correction value G2 is stored in advance in the storage unit 15 together with the first correction value G1 and the third correction value G3. For example, the second correction value G2 is a value of one or more.

As described above, by calculating the appropriate first coefficient K1 according to the output duty ratio Dout in each of a case where the output duty ratio Dout is equal to or less than the first threshold Dth1 and is larger than the second threshold Dth2 and a case where the output duty ratio Dout is equal to or less than the second threshold Dth2, the first voltage value Vobs can be made closer to an ideal voltage value more accurately in each of the two cases, so that a zero-cross detection timing can be more accurately matched with an ideal timing.

In the above embodiment, as an electric pump device of the present invention, the electric pump device 100 that supplies the cooling oil F to a driving motor mounted on a hybrid vehicle is exemplified. However, the electric pump device of the present invention is not limited to this, and the present invention can also be applied to, for example, an electric pump device that supplies oil to a transmission. Further, fluid discharged from the electric pump is not limited to oil such as cooling oil. Further, the motor control device of the present invention may be used as a control device that controls a three-phase motor mounted on a device other than an electric pump device.

Note that the present technique can have a configuration below. (1) A motor control device that controls a three-phase motor, the motor control device including a drive circuit that converts DC power supply voltage into three-phase AC voltage and supplies the three-phase AC voltage to the three-phase motor, a first voltage detection unit that detects terminal voltage of three phases of the three-phase motor, and a control unit that detects a point at which a first voltage value, which is a detection value of the terminal voltage, intersects a predetermined zero-cross determination level as a zero-cross point, and controls the drive circuit based on a detection result of the zero-cross point. The control unit corrects the first voltage value by multiplying the first voltage value by a first coefficient inversely proportional to an output duty ratio with respect to the three-phase motor in a case where the output duty ratio is equal to or less than a predetermined threshold. (2) The motor control device according to (1), in which the control unit calculates the first coefficient by multiplying a value obtained by subtracting the output duty ratio from a first threshold by a first correction value in a case where the output duty ratio is equal to or less than the first threshold. (3) The motor control device according to (1), in which the control unit calculates the first coefficient by multiplying a value obtained by subtracting the output duty ratio from a first threshold by a first correction value in a case where the output duty ratio is equal to or less than the first threshold and larger than a second threshold, and calculates the first coefficient by multiplying a value obtained by subtracting the output duty ratio from the second threshold by a second correction value in a case where the output duty ratio is equal to or less than the second threshold. (4) The motor control device according to any one of (1) to (3), further including a second voltage detection unit that detects the DC power supply voltage input to the drive circuit, in which the control unit corrects the first voltage value by multiplying the first voltage value by a second coefficient proportional to a second voltage value that is a detection value of the DC power supply voltage and the first coefficient. (5) The motor control device according to (4), in which the control unit calculates the second coefficient by multiplying the second voltage value by a third correction value. (6) An electric pump device including a three-phase motor having a shaft, a pump located on a first side in an axial direction of the shaft and driven by the three-phase motor via the shaft, and the motor control device according to any one of (1) to (5) that controls the three-phase motor.

The configurations described above in the present description may be appropriately combined in a range where no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls a three-phase motor, the motor control device comprising:
a drive circuit that converts DC power supply voltage into three-phase AC voltage and supplies the three-phase AC voltage to the three-phase motor;
a first voltage detection unit that detects terminal voltage of three phases of the three-phase motor; and
a control unit that detects a point at which a first voltage value, which is a detection value of the terminal voltage, intersects a predetermined zero-cross determination level as a zero-cross point, and controls the drive circuit based on a detection result of the zero-cross point,
wherein the control unit corrects the first voltage value by multiplying the first voltage value by a first coefficient inversely proportional to an output duty ratio with respect to the three-phase motor in a case where the output duty ratio is equal to or less than a predetermined threshold.

2. The motor control device according to claim 1, wherein the control unit calculates the first coefficient by multiplying a value obtained by subtracting the output duty ratio from a first threshold by a first correction value in a case where the output duty ratio is equal to or less than the first threshold.

3. The motor control device according to claim 1, wherein the control unit
calculates the first coefficient by multiplying a value obtained by subtracting the output duty ratio from a first threshold by a first correction value in a case where the output duty ratio is equal to or less than the first threshold and larger than a second threshold, and
calculates the first coefficient by multiplying a value obtained by subtracting the output duty ratio from the second threshold by a second correction value in a case where the output duty ratio is equal to or less than the second threshold.

4. The motor control device according to claim 1, further comprising:
a second voltage detection unit that detects the DC power supply voltage input to the drive circuit,
wherein the control unit corrects the first voltage value by multiplying the first voltage value by a second coefficient proportional to a second voltage value that is a detection value of the DC power supply voltage and the first coefficient.

5. The motor control device according to claim 4, wherein the control unit calculates the second coefficient by multiplying the second voltage value by a third correction value.

6. An electric pump device comprising:
a three-phase motor having a shaft;
a pump located on a first side in an axial direction of the shaft and driven by the three-phase motor via the shaft; and
the motor control device according to claim 1 that controls the three-phase motor.

* * * * *